United States Patent Office 3,411,091
Patented Nov. 12, 1968

3,411,091
MEANS FOR INDICATING THE RESIDUAL POWER
CAPACITY OF A BATTERY DURING SERVICE
Satsuro Umeda, 2/33–2 chome Uehara Shibuya-ku,
Tokyo, Japan
Continuation-in-part of application Ser. No. 250,845,
Jan. 11, 1963. This application Dec. 30, 1966, Ser.
No. 606,287
Claims priority, application Japan, July 19, 1962,
37/29,723
4 Claims. (Cl. 325—363)

ABSTRACT OF THE DISCLOSURE

An ammeter having a reverse temperature compensation due to a large negative temperature coefficient moving coil magnet, in a battery powered transistor circuit to offset the positive temperature dependent variation in transistor output current such that the maximum current response of the ammeter is an accurate measure of the reserve power level or instantaneous voltage of the battery at all expected environmental temperatures.

---

The present invention is a continuation-in-part of applicant's co-pending application Ser. No. 250,845 filed Jan. 11, 1963, and now abandoned.

The present invention relates to a means for indicating the available power capability of a battery during service and more particularly to an ammeter means for indicating the residual power level of a battery used to power a portable transistorized circuit such as a portable radio receiver.

Because the power output of a battery, for example, a dry cell used as the power supply of a portable electronic circuit, slowly decreases over a period of time and at a rate dependent on the operating conditions, including such factors as ambient temperature and power drain rate, etc., it becomes difficult for the circuit user to judge the residual power level of the battery after it has been in service for a period of time.

As the power level of, for example, a transistor radio battery drops off, the selectivity and sensitivity of the circuit also decrease until it becomes difficult if not impossible to tune in certain broadcast stations. Further, the final amplifier stage of a transistor radio is usually operated in the Class B mode and if the power level of the battery drops below a certain operating limit, the plus and minus portions of the push-pull audio wave form are broken off and the tone quality of any broadcast receptions which are picked up becomes very poor, if intelligible at all.

For these and other reasons, it is obviously very desirable for the user of a portable electronic circuit such as a transistor radio, to know in advance about when the battery power supply should be replaced so as to retain the optimum operating conditions of the circuit. The present invention was developed and operates to fulfill this specific need.

The present indicating means was specifically designed for use in a battery powered transistor circuit to provide a useful, quantitative indication of the power capability of the battery. The indicator of the present invention also functions, when used in a transistor circuit capable of being tuned to different signals, to indicate that the circuit is accurately tuned to one of those signals.

The current variation of a transistor amplifier or converter stage, particularly one controlled by an A.G.C. voltage, is substantial, having a ratio for the lowest and highest amplitude signals on the order of 20:1 for a strong signal level. The present invention takes advantage of this amplitude ratio to indicate the decreased transition of the power level of the battery used to power a transistor circuit. A specifically designed ammeter having a moving coil, a magnet and a pointer and having a full scale sensitivity corresponding to the non-signal current value is connected to be responsive to the output current of an I.F. stage of a battery powered transistor circuit.

The output current of the I.F. transistor stage has a maximum value dependent on the power level of the battery during a period while the stage is quiescent, which period occurs in response to no detectable signal being received because the receiver is not tuned to a station, i.e., the receiver is detuned. The maximum aplitude current causes the ammeter pointer to deflect to a maximum quantitative reading corresponding to the power level of the battery. Thus, the operator can turn on the circuit, tune it away from a signal, and immediately read how far the power level of the battery has dropped below its rated, shelf value (full scale reading) and determine whether the battery should be replaced.

In addition, the design and connection of the ammeter are such that the current fed to the moving coil member reflects the wide current swing of the A.G.C. transistor stage as the transistor circuit is tuned to one of several different signals. The ammeter pointer will therefore deflect from its maximum, battery power level indicating point to near the zero point when a tuning operation is performed. For example, in a transistor radio, the non-signal, off station current of the A.G.C. transistor stage in which the ammeter is connected may have a value of 400 μa. That current may decrease sharply to 17 μa. when the radio circuit is optimumly tuned to receive a broadcast frequency. Thus, as the ammeter pointer reverses its deflection with a tuning operation, it is possible to indicate the tuning center easily and accurately by surveying the minimized current of the A.G.C. transistor stage.

The above noted amplitude factor of a transistor stage varies with the environmental temperature due to the effect of the transistors in the circuit, that is, the temperature dependence which produces a variation in the impedance of a junction transistor; the current variations as a function of temperature are defined as a line having a positive slope. For example, in a portable transistor radio carried in an automobile on a hot day, the ambient temperature can increase up to 50° C. In such a case, the impedance of a junction transistor in the radio decreases and the quiescent D.C. current flow through the transistor emitter collector path increases. Hence, a conventional ammeter movement connected as indicated above would provide a reading different from the actual battery condition; in the above example the meter would indicate that the battery had a higher power level than it actually had.

The present ammeter indicating means includes a circuit element having a negative temperature coefficient to provide a reverse temperature compensation and thereby oppose the positive transistor temperature coefficient variations. By this means, the ammeter reading is an accurate representation of the battery power level and the ammeter scale can be calibrated to accurately determine power level at which the battery should be replaced.

One object of the invention is to provide an indicating means whereby the residual capacity of a battery used to power a transistor circuit can be checked accurately during service.

A second object of the invention is to provide an indicating means which can be connected to a transistor circuit without producing a mismatch in the transistor circuit impedance.

Another object of the invention is to provide an indicating means whereby a transistor circuit battery's residual capacity can be accurately surveyed without interference from the current variations in a temperature dependent junction transistor in the circuit due to temperature gradients affecting the impedance of the transistor.

A still further object of the invention is to provide an indicating means which operates as both a tuning indicator and a battery residual capacity indicator using ferrite magnets wherever a conventional electromagnetic meter instrument can not be used.

The indicating means according to this invention, together with additional objects and advantages thereof, will be best understood and more apparent from the following detailed description when read in connection with the accompanying drawings wherein.

Figure 1:
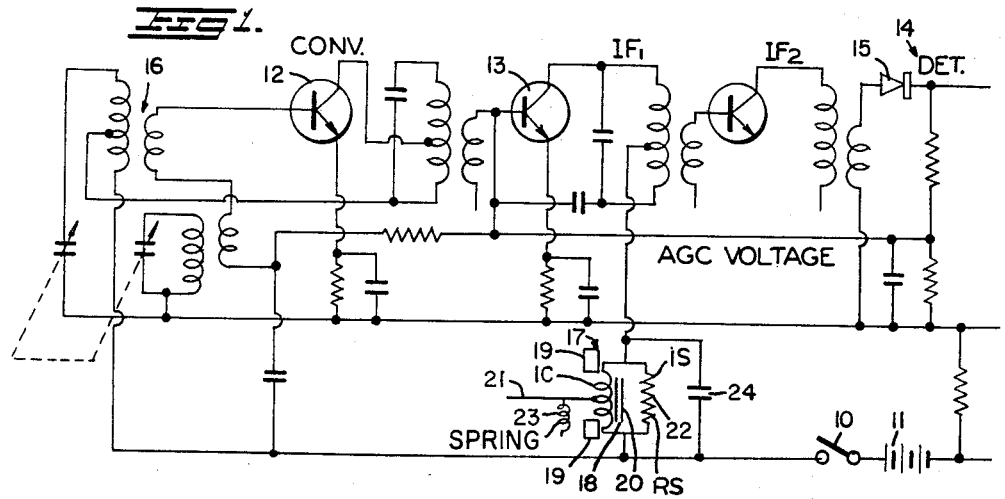
FIG. 1 is a circuit diagram of one form of battery powered transistor circuit embodying the indicating means of this invention.
Figure 5:
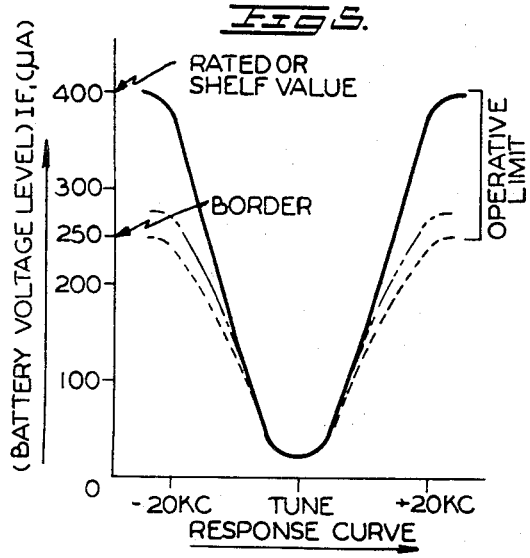
FIG. 5 is a graph showing the current response curves of an A.G.C. transistor stage through a tuning operating according to different battery residual power levels using the specific indicating means of this invention.

Referring now to FIG. 1, there is shown a schematic diagram of a portable transistor superheterodyne radio receiver energized by battery 11. Power from battery 11 is supplied via switch 10 to, inter alia, the emitter collector paths of NPN transistors 12 and 13, respectively comprising the converter and I.F. stages of the receiver. Automatic gain control for transistors 12 and 13 is derived by coupling the output of detector stage 14, including diode 15, to the bases of transistors 12 and 13. The IF$_1$ amplifying stage 13 provides such a large current gain due to the A.G.C. voltage control that it is unnecessary to employ additional amplifying circuitry to drive a current responsive meter that indicates the I.F. stage D.C. current. The amplitude of the D.C. current fed to the emitter collector path of I.F. transistor 13 is dependent, inter alia, on whether tuning circuit 16, connected to converter stage 12 is tuned or detuned relative to a broadcast station. As indicated by FIGURE 5, a relatively large D.C. current is applied to the collector of transistor 13 while tuner 16 is detuned from a broadcast station while the I.F. transistor 13 emitter collector current is relatively low while tuner 16 is on the center frequency of a broadcast station in proximity to the receiver.

To monitor the D.C. current applied to transistor 13 by battery 11, while tuner 16 is either tuned or detuned relative to a broadcast station, D.C. ammeter 17 is connected in series between battery 11 and the emitter collector path of transistor 13. Meter 17 includes the usual components of moving coil 18, connected to be responsive to the current flowing into the collector of transistor 13, as well as ferrite permanent magnets 19, core 20 on which coil 18 is wound, angularly deflectable movement 21, and spring 23 for controlling rotation of movement 21. In addition, coil 18 is shunted by resistor 22, having a relatively low negative temperature coefficient, and bypass capacitor 24 which substantially decouples any A.C. current from the meter movement.

In use, meter 17 serves the dual function of providing indications of whether: (1) battery 11 has a sufficient voltage to enable the transistors of the receiver to function properly; and (2) tuner 16 is properly tuned to a broadcast station. The determination of whether battery 11 provides sufficient voltage to the circuit is performed by adjusting tuner 16 so that it is detuned from any of the local broadcast stations. If the voltage of battery 11 is insufficient to enable transistors 12 and 13 to function properly, the movement 21 is deflected by less than a predetermined angle. Tuner 16 is properly adjusted to receive a station when movement 21 is deflected to a minimum angle.

Figure 2:
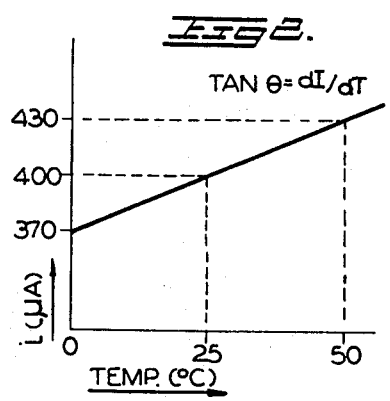
FIG. 2 is a graph showing a non-signal current variation in a junction transistor as its impedance varies according to its temperature dependence.

However, since the amplitude of D.C. current which flows in the IF$_1$ stage transistor 13 varies with the environmental temperature as a function having a positive slope, as shown in FIG. 2, a conventionally designed ammeter is inadequate to accurately indicate the current supplied to the circuit by battery 11. The current drain of the receiver transistors as a function of temperature results in the voltage of battery 11 being inversely related to temperature, particularly while tuner 16 is detuned, as clearly shown in FIG. 3 which illustrates the relation between the detune current of the transistor stage and the battery voltage at three different environmental temperatures A, B and C representing, for example, 25° C., 50° C., and 0° C., respectively. In the case where the border limit of a battery having a rated, shelf value corresponding to a circuit detune current value of 400 μa. is approximately 250 μa., curve A provides accurate voltage indications, while curves B and C obviously show indications which respectively are lower and higher than those of the actual battery reserve power levels. A conventional measuring circuit would indicate the temperature dependent characteristics illustrated by curves B and C and thereby is subject to providing erroneous battery condition indications.

Figure 3:
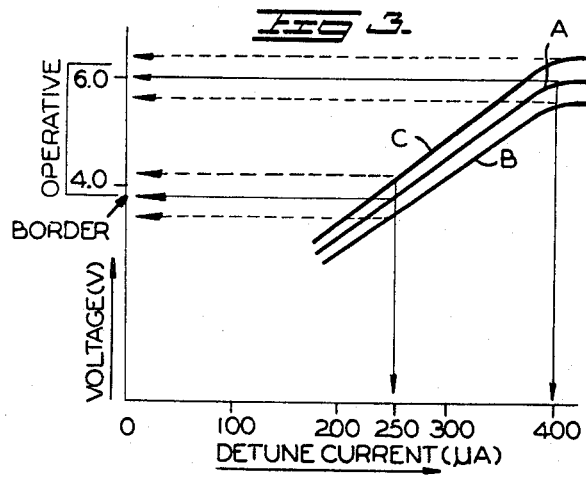
FIG. 3 is a graph showing the appropriate relations, using a conventional ammeter, of battery voltage to detune transistor output current according to three different ambient temperature levels.

The specific ammeter circuit of this invention has been developed to provide a battery power level indication which corresponds to curve A of FIG. 3 at all expected environmental temperatures. To achieve this result, the ammeter circuit has a current sensitivity versus temperature deflection gradient or slope which opposes the temperature dependent current variations of the transistor stage in which it is connected. In the preferred embodiment, shown schematically in FIG. 1 there is connected in shunt with ammeter coil 18 shunt resistor 22 formed of carbon film or the like. Register 18 has an optimum value and a low negative temperature coefficient. Magnets 19 of ammeter 17 are formed of a ferrite material having a large negative temperature coefficient, whereby the deflection angle of movement 21 versus temperature has a response with a negative slope, as illustrated by FIGURE 4.

Figure 4:
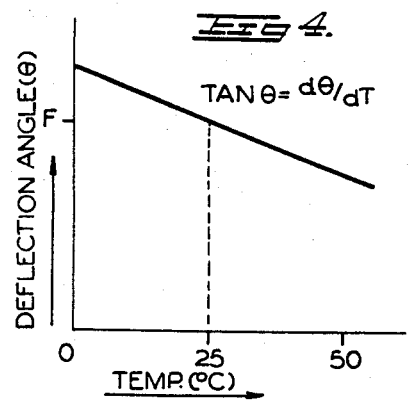
FIG. 4 is a graph showing the characteristics of the negative current sensitivity or reverse temperature compensation of the specific meter of this invention.

The graph shown in FIG. 4 illustrates the relation of the deflection angle of movement 21 to the environmental temperature. The graph shows that the changing inclination of the sensitivity gradient follows the relation, $$\tan \theta = d\theta/dT$$

where $\tan \theta$ is the sensitivity gradient, $\theta$ is the deflection angle, and T is the temperature.

The sensitivity gradient also follows the relation, $$\tan \theta = di/dT$$

where $i$ is a transistor current according to the temperature T. As seen in FIG. 2, the problem is to develop an ammeter circuit wherein changes in deflection angle $\theta$ are compensated to vary in opposition to changes in the transistor 13 current $i$ so that the resultant deflection angle of movement 21 accurately indicates the desired function. The primary object of the invention is achieved by providing a specific ammeter which performs the sensitivity change $$\tan \theta = d\theta/dT$$

such that the current value ($i$) necessary for full scale deflection at any expected environmental temperature coincides with that shown, for example, in curve A of FIG. 3.

By using a shunt resistor having a low negative coefficient in parallel with the moving coil 18, and ferrite magnet element 19 having a high negative temperature coefficient, an ammeter circuit is provided to correspond to all values of output current in the transistor 13 stage in which coil 18 is connected regardless of ambient temperature variations.

The component values are carefully selected so that the specific ammeter of the invention satisfies the relative design relation $$\tan\theta = i_s\left[\alpha - \beta + (e-\gamma)\left(1 + \frac{R_{so}}{R_{co}}\right)\right] \quad (1)$$

where $i_s$ in the current flow in the shunt resistor 22; $R_{co}$ is the resistance value of the moving coil 18 at 0° C.; $R_{so}$ is the resistance value of the shunt resistor 22 at 0° C.; $\alpha$ is the temperature coefficient of the moving coil 18; $\beta$ is the temperature coefficient of the shunt resistor 22; $(e-\gamma)$ is the algebraic total of the temperature coefficients of the moving coil spring 23 and the ferrite magnet 19 respectively.

Since $$\left(1 + \frac{R_{so}}{R_{co}}\right)$$

is equal to approximately 1, the relation (1) can be simplified to $$\tan\theta = i_s(\alpha - \beta + e - \gamma) \quad (2)$$

which forms a design equation compatible with values which can be chosen freely from $i_c > i_s$ to $i_c < i_s$ in the relation of coil current $i_c$ vs. shunt current $i_s$.

As can be seen from the above mentioned relative Equation 2, a low cost magnet such as a ferrite magnet cannot be used in a conventional instrument for the present indicating function due to the magnet high negative temperature coefficient, on the order of −0.0019/°C. In the present circuit, however, inexpensive ferrite magnet elements 19 are successfully utilized because of the compensating effect achieved thereby with regard to the temperature characteristics of transistor 13. Any discrepancy in the characteristics of the deflection angle of movement 21 as a function of temperature which is not compensated by the temperature characteristics of transistor 13 is compensated by shunt resistor 22, having a relatively low negative temperature coefficient. The establishment of a temperature gradient is possible even without a shunt resistor by designing the ammeter so as to satisfy the relative equation $$\tan\theta = i_c (e - \gamma) \quad (3)$$

By substituting a coil current ($i_c$) value of 800 μa., it is found that $$\tan\phi = 8\times 10^{-4} \times 1.7 \times 10^{-3} = 1.36 \text{ micro amp/° C.}$$

This is an example of a specific ammeter compatible with a transistor amplifier circuit which has a temperature gradient of 1.36 μa. per 1° C.

Throughout the environmental temperature range of at least 0 to 50° C., the specific ammeter design of this invention performs an indication similar to that shown in the room temperature condition (25° C.) curve A in FIG. 3.

Including the above design considerations with respect to the ammeter, it should be possible to include a battery power level indicating meter in any transistor circuit, radio or otherwise, and be able to obtain satisfactory compatibility.

What is claimed is:

1. A battery powered portable transistor radio receiver comprising an I.F. stage, said stage including a transistor having an emitter collector path with a response having a positive slope of current versus temperature, a D.C. ammeter having a coil connected in the emitter collector path of said transistor to provide selective indications of the condition of the battery and whether the receiver is tuned, said battery condition indication being derived while the receiver is detuned, said ammeter also including a magnet and a movement, said magnet and coil being responsive to said current to deflect said movement with a response having a relatively large negative slope of deflection angle versus temperature, a resistor having a relatively low negative temperature coefficient connected in shunt with said coil, thes negative temperature coefficient and said slopes being selected so that the deflection of the ammeter movement is relatively independent of receiver temperature.

2. The receiver of claim 1 wherein said magnet is of the ferrite type.

3. The receiver of claim 1 wherein the deflection angle, $\theta$, of said movement is expressed as:

$$\tan\theta = i_s\left[\alpha - \beta + (e-\gamma)\left(1 + \frac{R_{so}}{R_{co}}\right)\right]$$

where: $i_s$ is the current flowing through the shunt resistor; $R_{co}$ is the resistance value of the coil at 0° C.; $R_{so}$ is the resistance value of the shunt resistor at 0° C.; $\gamma$ is the relatively large negative slope; and $\beta$ is the temperature coefficient of said resistor.

4. The receiver of claim 1 wherein the deflection angle, $\theta$, of said movement is expressed as:

$$\tan\theta = i_s[\alpha - \beta + (e-\gamma)]$$

where: $i_s$ is the current flowing through the shunt resistor; $\gamma$ is the relatively large negative slope; and $\beta$ is the temperature coefficient of said resistor.

UNITED STATES PATENTS

References Cited

| | | | |
|---|---|---|---|
| 2,159,240 | 5/1939 | Wheeler | 334—31 XM |
| 3,112,444 | 11/1963 | Parker | 324—105 |

KATHLEEN H. CLAFFY, *Primary Examiner.*

R. S. BELL, *Assistant Examiner.*